United States Patent

[11] 3,572,599

[72] Inventor Elwyn P. Hilmer
    3028 Valmont Ave., Boulder, Colo. 80302
[21] Appl. No. 815,932
[22] Filed Apr. 14, 1969
[45] Patented Mar. 30, 1971

[54] WINCH
7 Claims, 2 Drawing Figs.

[52] U.S. Cl. .................................................. 242/54,
    74/802, 242/117, 254/186
[51] Int. Cl. ............................................... B65h 75/00
[50] Field of Search .................................. 242/54,
    67.1, 117; 254/186, 187; 74/675, 797, 802

[56] References Cited
    UNITED STATES PATENTS

| | | | |
|---|---|---|---|
| 286,206 | 10/1883 | Lavery | 74/802 |
| 1,270,487 | 6/1918 | Brown | 74/797 |
| 1,270,489 | 6/1918 | Brown | 74/797 |
| 1,270,490 | 6/1918 | Brown | 74/797 |
| 2,412,440 | 12/1946 | Bruestle | 242/54X |
| 2,643,131 | 6/1953 | King | 242/117X |
| 3,122,945 | 3/1964 | Chung | 74/802 |
| 3,130,608 | 4/1964 | Morin | 74/797 |
| 3,405,878 | 10/1968 | Lawrence | 242/54 |

FOREIGN PATENTS

| | | | |
|---|---|---|---|
| 191,115 | 1/1964 | Sweden | 242/54 |
| 260,751 | 10/1928 | Italy | 74/802 |
| 622,139 | 6/1961 | Italy | 74/802 |
| 664,294 | 8/1929 | France | 74/802 |
| 1,093,687 | 5/1955 | France | 74/797 |

*Primary Examiner*—Stanley N. Gilreath
*Assistant Examiner*—Werner H. Schroeder
*Attorney*—Charles L. Lovercheck ABSTRACT: This disclosure describes the preferred embodiment of a speed reducer and winch combination made up of spaced support members each having a bearing on it, a hollow shaft rotatably supported in one bearing and a solid shaft extending through the hollow shaft and rotatably received in the other bearing, a first sprocket is supported on the solid shaft and a second sprocket is supported on the hollow shaft, a large sprocket is rotatably supported on the solid shaft between the first sprocket and second sprocket, a third shaft is supported on the large sprocket offset from its center and swung by it around the first and second sprocket, two small sprockets are supported on the third shaft. In the embodiment disclosed, sprockets and chains connecting the sprockets providing an epicyclic train are shown. However, the speed reducer can be used as a winch by providing flanges on the hollow shaft thereby making a spool. A sprocket may be used as a driver for the planet. This sprocket, as well as the other sprockets, could be V-belts and sheaves, timing belts and sheaves, or gears. Cable free reel-out is provided by a pull pin that when pulled will allow the stationary sprocket to rotate, which in turn rotates the planet sprocket freely. By the arrangement, equal slack in the two chains or equal center distance is achieved between the planet sprockets and the sprockets that are supported on the central shafts all of which are different size sprockets and the chains being of different lengths. The winch may be driven by any rotating power means.

Patented March 30, 1971 3,572,599

INVENTOR
ELWYN P. HILMER

BY *Charles L. Lovercheck*

ATTORNEY

WINCH

FIELD OF INVENTION

This invention relates to speed reducers and, more particularly, to a speed reducer in combination with a winch spool for pulling a line.

OBJECTS OF THE INVENTION

It is an object of the invention to provide an improved speed reducer.

Another object of the invention is to provide a speed reducer in combination with a winch.

Another object of the invention is to provide an improved winch.

Another object of the invention is to provide a speed reducer and winch combination which is simple in construction, economical to manufacture and simple and efficient to use.

THE DRAWINGS

DETAILED DESCRIPTION OF THE DRAWINGS

Figure 2:
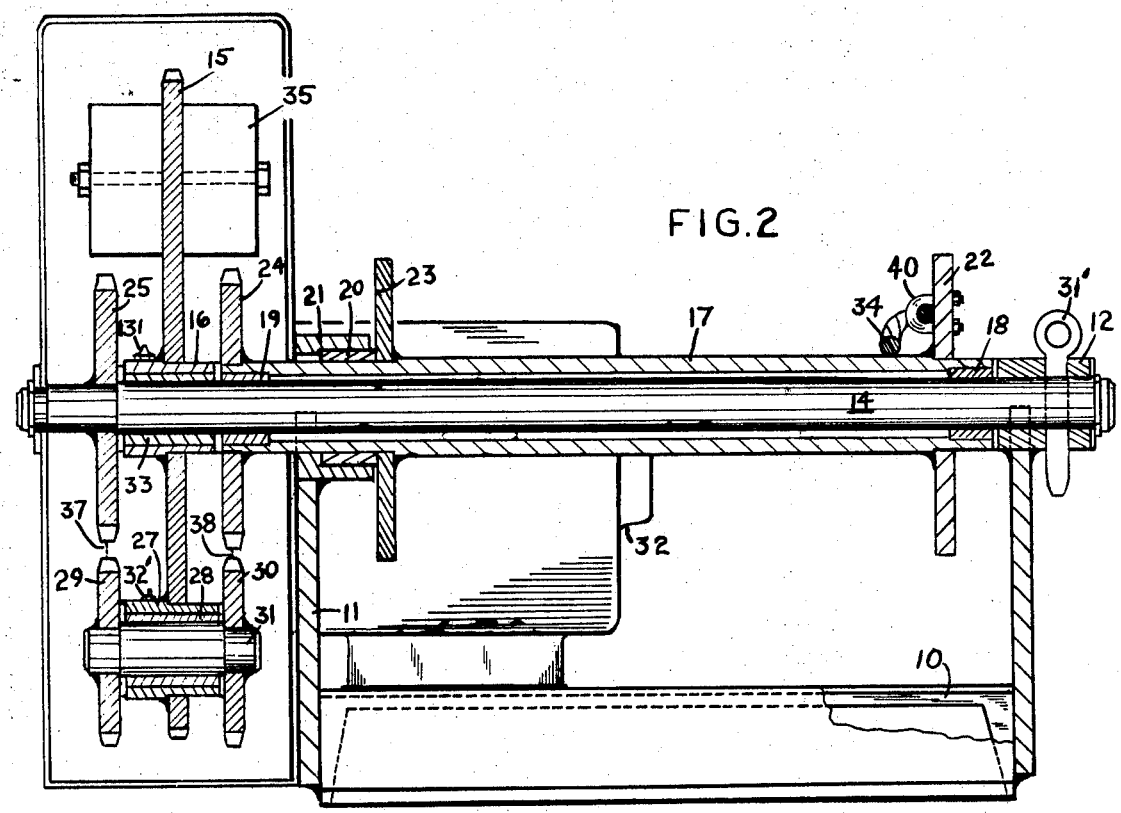
FIG. 2 is a longitudinal cross sectional view taken on line 2—2 of FIG. 1.
Figure 1:
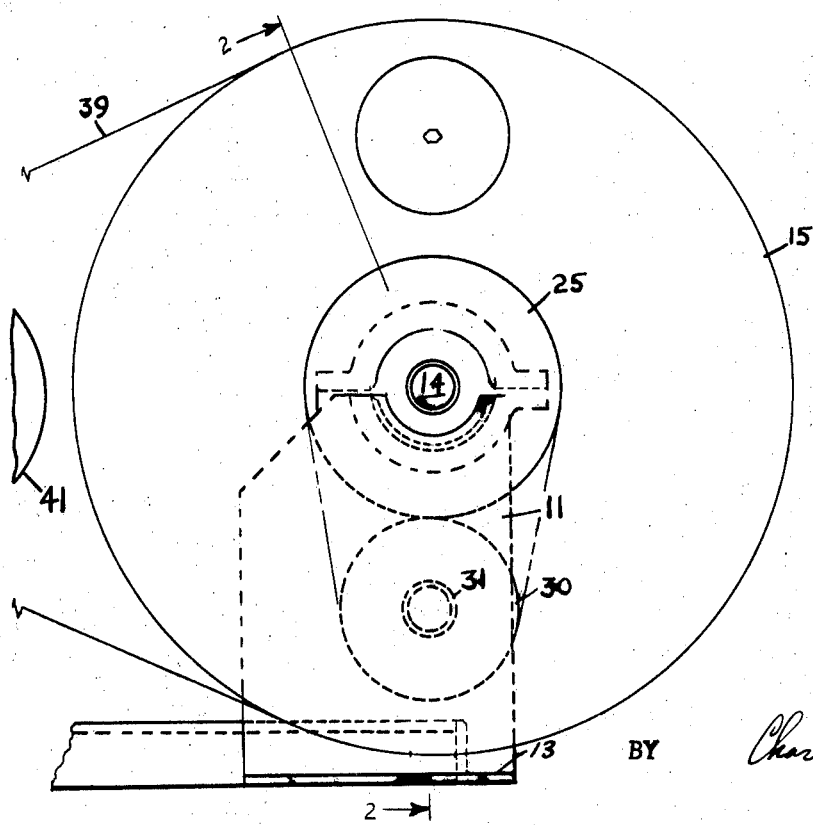
FIG. 1 is an end view of the winch according to the invention.

The drawings show an epicyclic speed reducer in combination with a winch. The speed reducer is provided with wheels that could be either sprockets connected by chains or they could be gears or pulleys connected by V-belts, or timing belts.

The device has a frame 10 including an inverted channel and an angle 13 and upwardly extending support members 11 fixed to the base. Bearing support 21 and sleeve 12 are fixed to the support members 11 and a sleeve bearing 20 is rotatably received in bearing support 21. Hollow shaft 17 is rotatably supported in bearing 20 and it has an internal sleeve bearing 18 in it which supports its opposite end on the solid shaft 14. The ends of the solid shaft extend beyond the ends of the hollow shaft 17 and the solid shaft is rotatably supported between sleeve bearing 19 in the hollow shaft and sleeve 12. The solid shaft has a hole in it which aligns with the hole in the sleeve 12 in which a pin 31' may be inserted. The flanges 22 and 23 may be fixed to the hollow shaft 17 to provide a spool for a winch to support a cable such as indicated at 34 and clamp 40.

A second wheel 24 is fixed to the end of a hollow shaft 17 and a rotatable or stationary first wheel 25 is fixed to the end of the solid shaft 14. Wheel 15 is centrally mounted on shaft 14 by means of sleeve 16 and bearing 33. Tubing sleeve 27 is fixed to the large planet support wheel 15 and spaced from the center of rotation of large planet support wheel 15 as shown. The tubing sleeve 27 on large wheel 15 offset from the wheel center has a sleeve bearing 28 in it which receives the third shaft 31. Wheel 15 swings wheels 29 and 30 around its center. The third shaft 31 has the planet fourth and third wheels 29 and 30 fixed to its ends to rotate with the shaft. A counterweight 35 is supported on the large wheel 15 to counterbalance the eccentric load caused by the assembly made up of the shaft 31 and wheels 29 and 30 and bearing 28, sleeve 27. Lubrication fittings 131 and 32' are provided to lubricate the bearings 33 and 28. Band 37 is indicated as connecting the wheel 25 to the wheel 29 and band 38 connects the wheel 24 to the wheel 30. In the preferred embodiment of the invention shown the wheels are in the form of sprockets connected by chains. It is contemplated that toothed gears or pulleys and belts could be used as well as chains and sprockets. A belt or chain 39 connects the wheel 41 to the large wheel 15. Wheel 41 is connected to motor 32. It will be noted that when the pin 31' is removed, and wheel 41 on motor 32 does not rotate, a pull on cable 34 will cause the spool 17, 22 and 23 to free wheel driving through wheel 24, band 38 to wheel 30 and shaft 31 and wheel 29 to band 37 to wheel 25 rotating shaft 14 freely. When pin 31' is inserted in sleeve 12 and shaft 14, a speed reduction will be accomplished between the rotation of wheel 15 and the rotation of the spool made up of shaft 17 and flanges 22 and 23. The bands 37 and 38 will have equal slack and the center distance between the center of wheels 25 and 29 will be equal to the center distance between the centers of wheels 24 and 30. The wheels 25, 29, 24 and 30 all have different diameters to accomplish the speed reduction.

The embodiments of the invention in which an exclusive property or privilege is claimed are defined as follows:

I claim:

1. An epicyclic speed reducer comprising:
   a frame;
   a first shaft rotatably supported on said frame;
   a first wheel fixed to said first shaft;
   a second hollow shaft rotatably supported on said frame;
   a second wheel on said second shaft;
   said first shaft being rotatably supported on said second shaft;
   a large planet support wheel rotatably supported on said first shaft and by said second shaft;
   a third shaft supported on said large planet support wheel;
   a third wheel supported on one end of said third shaft and a fourth wheel supported on the other end of said third shaft;
   means releasably holding said first shaft against rotation;
   means connecting said first wheel to said fourth wheel and means connecting said second wheel to said third wheel, said first wheel, said second wheel and said large wheel being concentric with each other; and
   means to rotate said large wheel whereby said third shaft is swung around said first shaft and said second wheel is rotated at a speed different than said large wheel.

2. The speed reducer recited in claim 1 wherein said wheels are sprockets and said means connecting said first wheel to said fourth wheel and said means connecting said second wheel to said third wheel comprise chains.

3. The speed reducer recited in claim 1 wherein said first wheel, said second wheel, said third wheel and said fourth wheel all have different diameters from each other.

4. The speed reducer recited in claim 2 wherein said second shaft is a hollow shaft.

5. The speed reducer recited in claim 3 wherein said second shaft is a hollow shaft and said first shaft has one end rotatably received in said first shaft.

6. The speed reducer recited in claim 5 wherein said releasable means fix said first shaft against rotation to said frame.

7. The speed reducer recited in claim 1 wherein a spool is fixed to said second shaft, and a drive means is provided to rotate said large wheel whereby a winch is provided.